United States Patent [19]

Pohl

[11] Patent Number: 4,492,369

[45] Date of Patent: Jan. 8, 1985

[54] DOOR LIFTING AND CENTERING DEVICE FOR HANGING HEAVY DOORS

[76] Inventor: Harold F. Pohl, 69 Dawn Ave., Plano, Ill. 60545

[21] Appl. No.: 464,308

[22] Filed: Feb. 7, 1983

[51] Int. Cl.$^3$ .................................... B23Q 3/18

[52] U.S. Cl. .................................... 269/60; 269/905

[58] Field of Search .............. 254/7 R, 7 B, 7 C, 8 R, 254/8 B, 8 C, 126; 269/904, 905, 60

[56] References Cited

U.S. PATENT DOCUMENTS

| | | | |
|---|---|---|---|
| 472,200 | 4/1892 | Seiler | 254/126 |
| 1,051,633 | 1/1913 | Price | 254/126 |
| 1,228,805 | 6/1917 | Morris | 254/126 |
| 2,503,388 | 4/1950 | Hedlund | 269/905 |
| 2,568,289 | 9/1951 | Morey | 254/8 B |
| 3,876,096 | 4/1975 | Latek | 254/8 R |
| 4,141,192 | 2/1979 | Augustine | 269/905 |

FOREIGN PATENT DOCUMENTS

| | | | |
|---|---|---|---|
| 426972 | 10/1967 | Switzerland | 254/8 R |
| 858464 | 5/1958 | United Kingdom | 254/7 B |

*Primary Examiner*—Robert C. Watson
*Attorney, Agent, or Firm*—Ernest Kettelson

[57] ABSTRACT

A door lifting and centering device for hanging heavy doors comprising a base plate, a lift plate positioned above the base plate having a jack screw member threaded through an internally threaded portion of the lift plate whereby the lift plate is raised relative to the base plate when the jack screw member is rotated. The lift plate includes projecting fingers which extend forwardly to be inserted under the bottom edge of a heavy door which is to be hung in a door frame. The jack screw member includes an elongated shank which extends upwardly to waist height of the installer or other convenient height whereby the installer does not have to stoop in order to rotate the jack screw. He can remain upright whereby he is able to see the holes in the door hinges and properly align them with the corresponding holes in the door jamb or door frame, while at the same time rotating the jack screw causing the door to slowly lift until he can see that the apertures in the hinge and in the door frame are properly aligned. A convenient knob or handle is attached to the upper end of the elongated shank of the jack screw to enable the installer to easily rotate the jack screw. The lift plate is connected to the base plate such as by a hinged connection at the end of the lift plate opposite the projecting fingers.

4 Claims, 7 Drawing Figures

DOOR LIFTING AND CENTERING DEVICE FOR HANGING HEAVY DOORS

BACKGROUND OF THE INVENTION

This invention relates to the field of devices for lifting and centering doors for the purpose of hanging to a door frame or door jamb. Within this broad field the invention is particularly directed for use with unusually heavy doors such as the heavy metal doors used for cell blocks which weigh between 140 to 175 pounds, for lead shield doors for use in hospitals which weigh as much as 200 to 300 pounds as well as being unusually wide, sometimes up to four feet, as well as being unusually high, sometimes up to seven or eight feet, and other unusually heavy doors of this type. Some of these unusually heavy doors also have other characteristics which make them more difficult to hang than ordinary doors. For example, the heavy metal doors used in cell blocks of prisons include hinge members which do not have removable hinge pins. Therefore, the holes in the hinge member which is to be bolted to the door frame have to be lined up precisely with the corresponding holes in the door frame in order to insert and secure the bolts or screws which are used to hold the hinge member to the door frame.

Prior art devices which have been used to lift, center and otherwise facilitate hanging of doors include the door brace disclosed in U.S. Pat. No. 4,141,192, the wedging tool disclosed in U.S. Pat. No. 3,021,112, a household utility jack disclosed in U.S. Pat. No. 2,910,270, the door hanger and trolley disclosed in U.S. Pat. No. 2,503,388 and the cleaving wedge disclosed in U.S. Pat. No. 1,407,719.

The devices known to the prior art for use in lifting, centering and otherwise facilitating the handing of doors are complicated and cumbersome affairs and many are adapted for use only with particular types of doors. The door lifting and centering device in accordance with the present invention is a relatively simple and sturdy device which can be used universally with doors of all types and it includes the feature of an elongated operating member whereby the installer does not have to bend over or stoop in order to operate the device.

SUMMARY OF THE INVENTION

It is an object of the invention to provide a door lifting and centering device for hanging heavy doors wherein the operating member is elongated, reaching waist height of the installer or other convenient level enabling him to operate the device without bending.

It is an object of the invention to provide a door lifting and centering device for heavy doors comprising a very simplified and sturdy mechanism which is easily portable and which includes a minimum of moving parts.

It is an object of the invention to provide a door lifting and centering device for hanging heavy doors comprising a base plate and a lift plate positioned above the base plate which is permanently secured to the base plate.

It is an object of the invention to provide a door lifting and centering device for hanging heavy doors having a base plate and a lift plate hingedly connected thereto, the lift plate including a jack screw member for raising and lowering the lift plate relative to the base plate, the jack screw member including an elongated operating member whereby it can be operated without the operator having to bend over.

It is an object of the invention to provide a door lifting and centering device for hanging heavy doors comprising a base plate, a lift plate lying on top of the base plate when in its lowered position, the lift plate including projecting fingers for insertion under the bottom edge of a door and the lift plate including means for raising and lowering the lift plate relative to the base plate thereby also raising and lowering a door to center it properly for hanging.

DESCRIPTION OF PREFERRED EMBODIMENT

Figure 1:
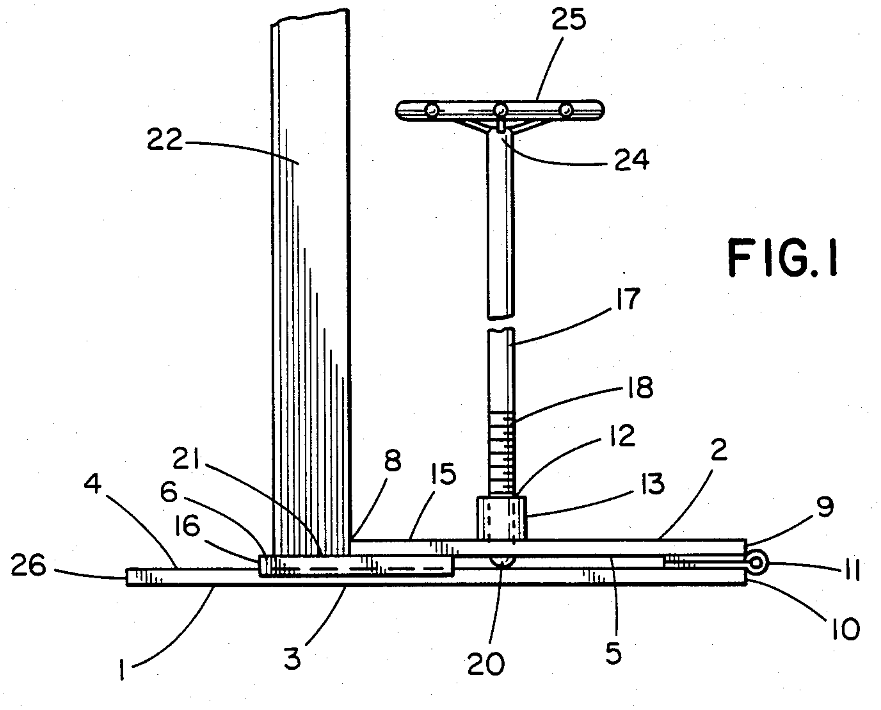
FIG. 1 is a side elevation view of a door lifting and centering device for hanging heavy doors in accordance with this invention, shown in its lowered position.
Figure 2:
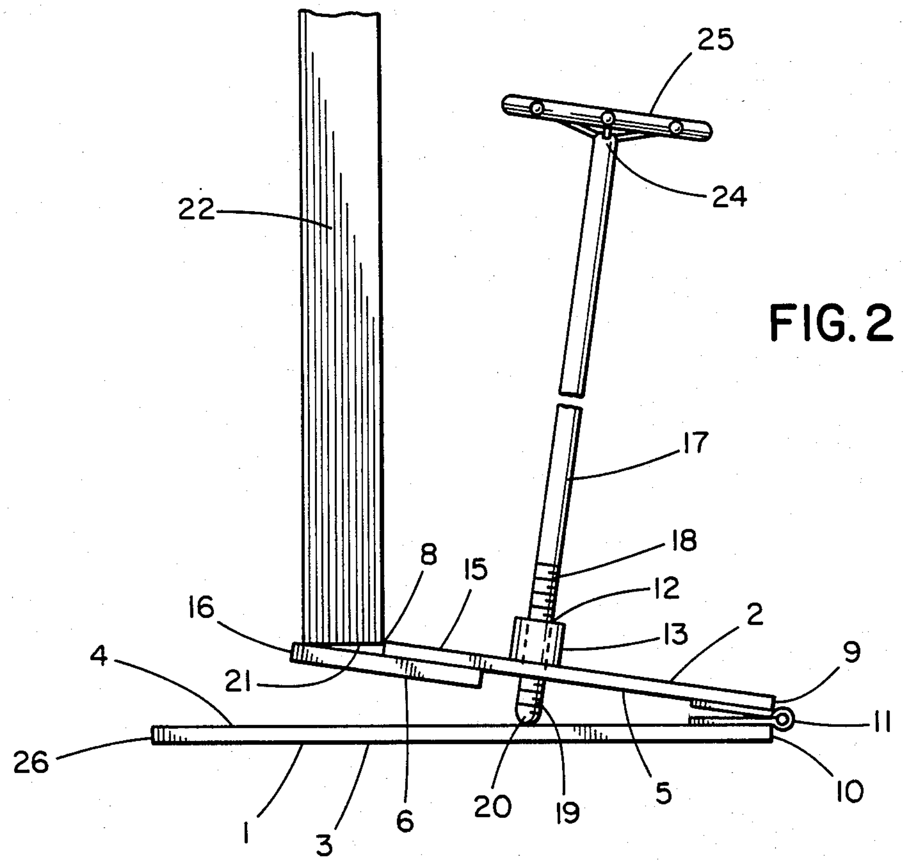
FIG. 2 is a side elevation view of the door lifting and centering device shown in FIG. 1, but in its partially raised position.
Figure 3:
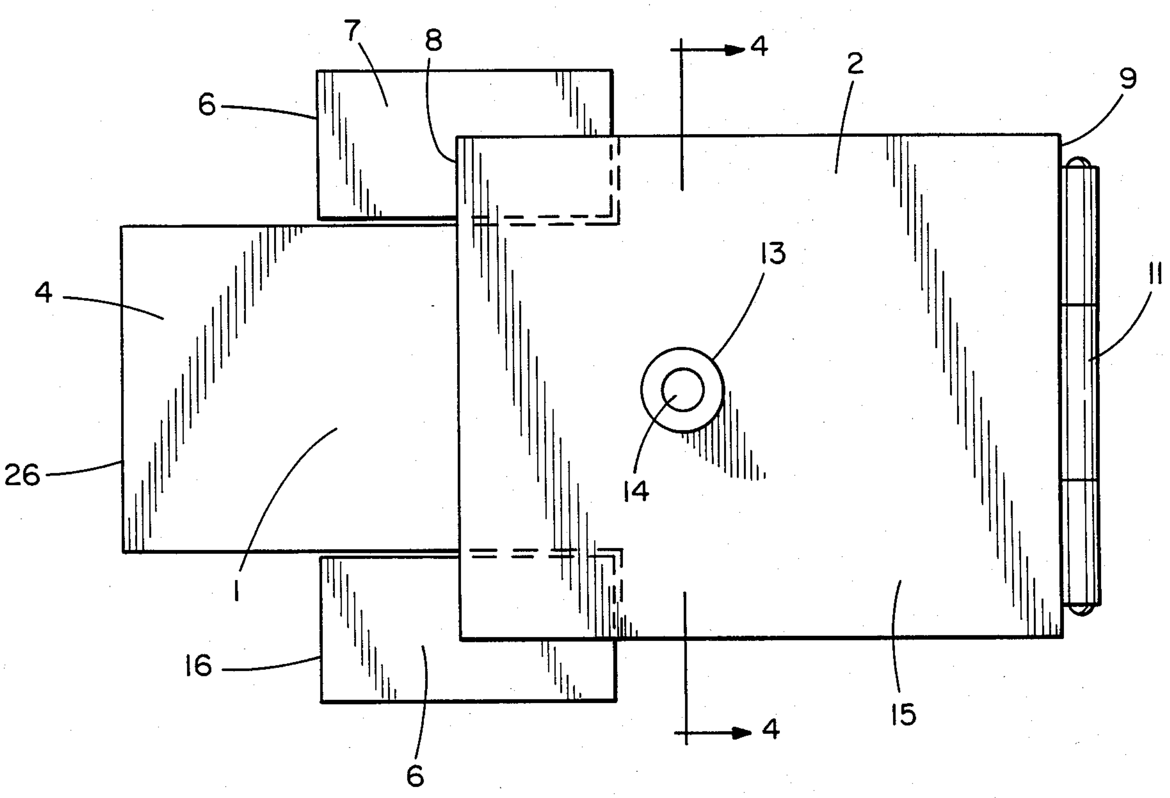
FIG. 3 is a plan view of a door lifting and centering device in accordance with this invention but with the elongated operating member of the jack screw assembly removed.
Figure 4:
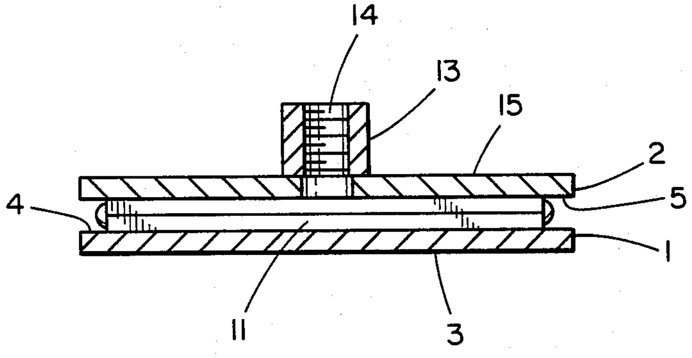
FIG. 4 is a section view taken on line 4—4 of FIG. 3.
Figure 5:
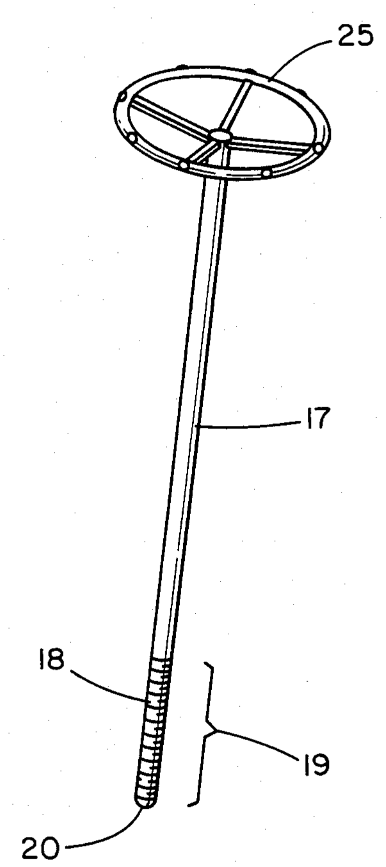
FIG. 5 is a perspective view of the elongated operating member of the jack screw assembly for use in the door lifting and centering device in accordance with this invention.
Figure 6:
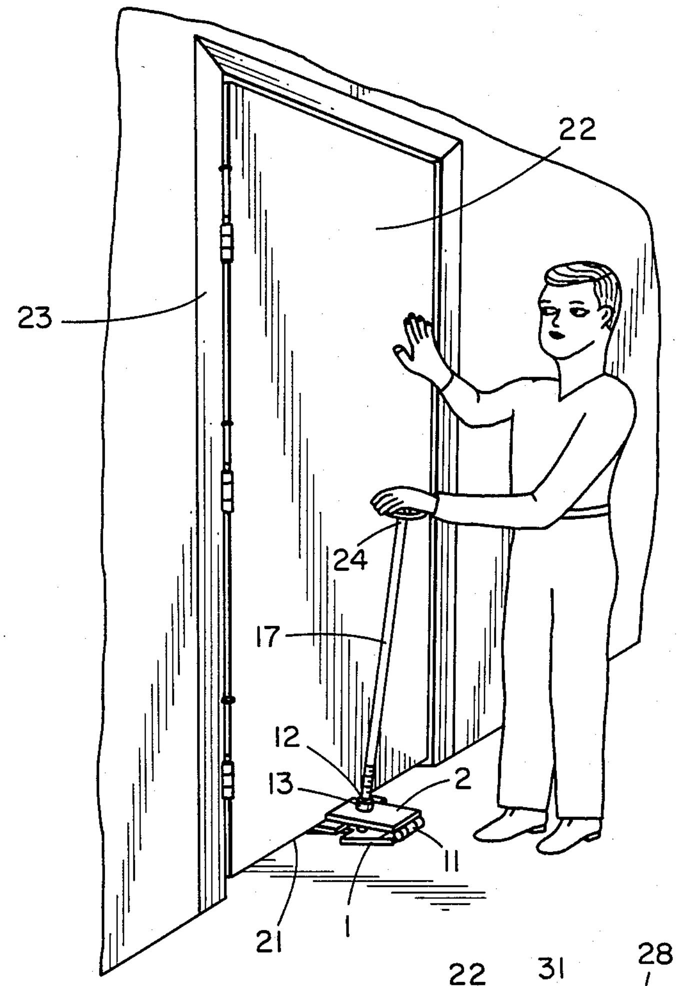
FIG. 6 is a perspective view of a door installer using the door lifting and centering device in accordance with this invention to hang a door to a door frame.
Figure 7:
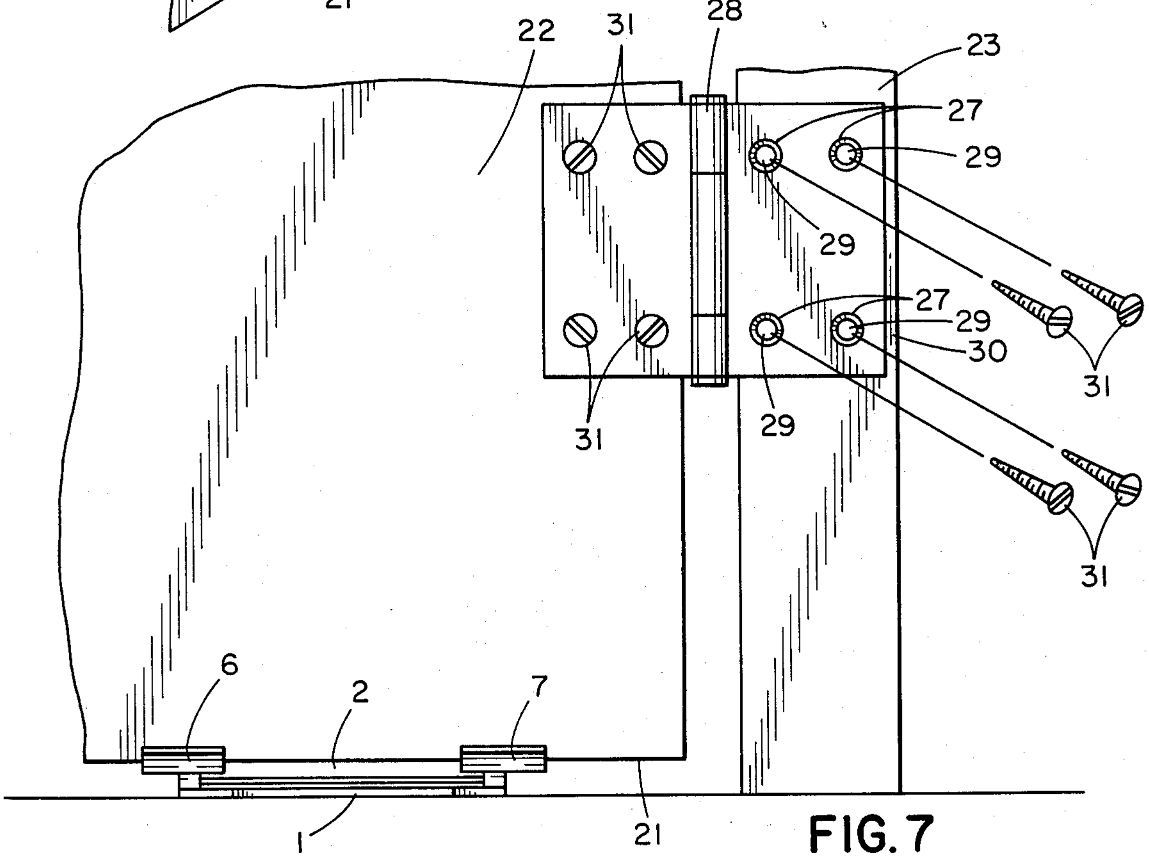
FIG. 7 is an enlarged view of a segment of a door and door frame showing the door lifted by the lifting and centering device in accordance with this invention to align the apertures in a non-separable door hinge with the corresponding apertures in the door frame through which screws will be screwed in place to secure the door to the frame.

The door lifting and centering device for hanging heavy doors in accordance with this invention includes a base plate 1 and a lift plate 2 positioned above the base plate 1 and resting thereon in its lowered position. The base plate 1 is preferably a flat piece of heavy metal having a flat smooth bottom surface 3 and a similarly flat smooth upper surface 4. The lift plate 2 also comprises a flat piece of heavy metal having a flat smooth lower surface 5 which rests against the upper surface 4 of the base plate 1 when the lift plate 2 is in its lowered position.

The lift plate 2 includes a pair of projecting fingers 6 and 7 which project outwardly from one end 8 of the lift plate 2. The combined length of the lift plate 2 and its projecting fingers 6 and 7 is preferably somewhat less than the length of the base plate 1.

The lift plate 2 is hingedly connected at its opposite end 9 to the corresponding end 10 of the base plate 1 by hinge assembly 11.

A jack screw assembly 12 is incorporated in the lift plate 2 comprising an upwardly extending body portion 13 projecting upwardly from the top surface 15 of the lift plate 2. The upwardly extending body portion 13 of the jack screw assembly 12 includes an internally threaded central bore 14 extending through the body portion 13 and also through an aperture in the lift plate 2. The upwardly extending body portion 13 of the jack screw assembly 12 is centrally located on the lift plate 2 and spaced apart from the hinged end 9 of the lift plate 2 a distance which is substantially equal to the distance of the body portion 13 of the jack screw assembly 12 from the outer free ends 16 of the projecting fingers 6 and 7 which project outwardly from the end 8 of lift plate 2. The jack screw assembly 12 includes an elongated operating member 17. The externally threaded lower end region 19 of the elongated operating member 17 is threaded through the internally threaded central bore 14 with the lower free end 20 of the elongated operating member 17 bearing against the upper surface 4 of the base plate 1. The elongated operating member 17 of the jack screw assembly 12 is long enough to reach upwardly to approximately the waist level of an operator or door installer when the projecting fingers 6 and 7 of the lift plate 2 are inserted under the bottom edge 21 of a door 22 which is being positioned within a door frame 23 for hanging.

The upper end 24 of the elongated operating member 17 includes a circular rotatable handle or knob 25 which the operator or door installer can easily grasp in his hand to rotate the elongated operating member 17. The elongated operating member 17 may be completely removed from the internally threaded body portion 13 of the jack screw assembly when the device is not in use to make a more compact unit for storage and for portability. When the device is to be used, it is a relatively simple operation to insert the lower free end 20 of the elongated operating member 17 in the central bore 14 of the jack screw assembly 12 and thread it through by rotating until the lower free end 20 begins to bear against the upper surface 4 of the base plate 1.

In operation, the lift plate 2 is placed in its lowered position with its lower surface 5 adjacent to and facing the upper surface 4 of the base plate 1. The forwardly extending end 26 of the base plate 1 and the outer free ends 16 of the projecting fingers 6 and 7 are moved under the bottom edge 21 of a door 22 which is positioned for hanging in a door frame 23. The projecting fingers 6 and 7 extend outwardly from the end 8 of lift plate 2 a distance which corresponds substantially to the width of the door with which the device is to be used and they may extend somewhat beyond the width of the door. The operator or door installer then grasps the handle or knob 25 at the upper end of the elongated operating member of the jack screw assembly which is approximately at his waist level or other convenient position whereby he does not have to bend or stoop over in order to operate the lifting device. The operator or door installer then rotates the elongated operating member in the direction which causes the external threads 18 at the lower end region 19 of the operating member 17 which are in threaded engagement with the internal threads of central bore 14 of the body portion of the jack screw assembly 12 to raise the lift plate 2 and the projecting fingers 6 and 7 on which the bottom edge 21 of the door 22 is resting. The operator or door installer rotates the elongated operating member in the lifting direction while at the same time viewing the apertures 27 and the door hinges 28 until they are perfectly aligned with the corresponding apertures 29 in the side wall 30 of the door frame 23. At such time the operator or door installer discontinues rotation of the operating member 17 which remains in position even after the operator or door installer has removed his hand from the handle or knob 25. The door 22 remains held in the desired position while the door installer inserts screws 31 through the aligned apertures 27 and 29 to hang the door in its installed position. After the door has been installed, the elongated operating member is then rotated in the opposite direction to lower the lift plate back to its original lowered position whereupon it can slide freely out from under the bottom edge 21 of the door 22.

I claim:

1. A door lifting and centering device for hanging heavy doors, comprising door engaging means to raise and lower a door to position it for hanging, lifting means to raise and lower said door engaging means, said lifting means including elongated operating means to operate said lifting means for raising and lowering said door engaging means, said elongated operating means including a hand grasp member, said elongated operating means extending between said door engaging means and said hand grasp member a preselected distance, said preselected distance being long enough to position said hand grasp member at a height relative to a person operating said device whereby he need not stoop down in order to reach said hand grasp member with his hand for operation of said device when said door engaging means thereof has engaged a door for positioning said door for hanging, wherein said lifting means includes a base plate having a flat smooth upper surface, a lift plate positioned above said base plate, said door engaging means includes a projecting finger projecting outwardly from an edge of said lift plate, said lift plate and said projecting finger extending in one direction a first distance, said base plate extending in said one direction at least said first distance, an aperture through said lift plate, a projecting body portion extending upwardly from said upper surface of said lift plate positioned over said aperture and integrally connected to said lift plate, said projecting body portion including an internally threaded bore therethrough, said internally threaded bore being in registration with said aperture, said elongated operating means including an elongated shaft having a first free end and an opposite second end, a portion of said elongated shaft having external threads formed thereon from an intermediate point thereon and extending to said first free end, said first free end being received in said internally threaded bore of said body portion becoming threadedly engaged therewith, said first free end being movable through said bore and said aperture through said lift plate to contact and bear against said flat smooth upper surface of said base plate, said hand grasp member being affixed to said second end of said elongated shaft, wherein said lifting means includes connecting means to connect said lift plate to said base plate, said connecting means including a hinge assembly to connect a first end of said lift plate to a corresponding first end of said base plate.

2. A door lifting and centering device for hanging heavy doors, comprising door engaging means to raise and lower a door to position it for hanging, lifting means to raise and lower said door engaging means, said lifting means including elongated operating means to operate said lifting means for raising and lowering said door engaging means, said elongated operating means including a hand grasp member, said elongated operating means extending between said door engaging means and said hand grasp member a preselected distance, said preselected distance being long enough to position said hand grasp member at a height relative to a person operating said device whereby he need not stoop down in order to reach said hand grasp member with his hand for operation of said device when said door engaging means thereof has engaged a door for positioning said door for hanging, wherein said lifting means includes a base plate having a flat smooth upper surface, a lift plate positioned above said base plate, said door engaging means includes a pair of spaced apart projecting fingers projecting outwardly from said lift plate to receive the bottom edge of a door on said pair of spaced apart projecting fingers, said lift plate and said projecting fingers extending outwardly a first dimension, said base plate extending outwardly at least as far as said first dimension and coextensive therewith, an aperture through said lift plate, a projecting body portion extending upwardly from said upper surface of said lift plate positioned over said aperture and integrally connected to said lift plate, said projecting body portion including an internally threaded bore therethrough, said internally threaded bore being in registration with said aperture, said elongated operating means including an elongated shaft having a first free end and an opposite second end, a portion of said elongated shaft having external threads formed thereon from an intermediate point thereon and extending to said first free end, said first free end being received in said internally threaded bore of said body portion becoming threadedly engaged therewith, said first free end being movable through said bore and said aperture through said lift plate to contact and bear against said flat smooth upper surface of said base plate, said hand grasp member being affixed to said second end of said elongated shaft, wherein said lifting means includes connecting means to connect said lift plate to said base plate, said connecting means including a hinge assembly to connect a first end of said lift plate to a corresponding first end of said base plate.

3. A door lifting and centering device for hanging heavy doors, comprising a base plate having a flat, smooth upper surface, a lift plate positioned above said base plate, an aperture through said lift plate, said lift plate including a lower surface facing said base plate and an oppositely facing upper surface, a projecting body portion extending upwardly from said upper surface of said lift plate positioned over said aperture and integrally connected to said lift plate, said projecting body portion including an internally threaded bore therethrough, said internally threaded bore being in registration with said aperture through said lift plate, an elongated shaft having a first free end and an opposite second end, a portion of said elongated shaft having external threads formed thereon from an intermediate point thereon and extending to said first free end, said first free end being received in said internally threaded bore of said body portion becoming threadedly engaged therewith, said first free end being movable through said bore and said aperture through said lift plate to contact and bear against said flat smooth upper surface of said base plate, a hand grasp member affixed to said second end of said elongated shaft, including connecting means to connect said lift plate to said base plate, said connecting means including a hinge assembly to connect a first end of said lift plate to a corresponding first end of said base plate, said lift plate including a second end spaced apart oppositely from said first end, at least one projecting member at said second end of said lift plate to receive the bottom edge of a door thereon for lifting, said base plate being at least as long as the combined lengths of said lift plate and said projecting member thereof.

4. A door lifting and centering device for hanging heavy doors comprising a base plate having a flat smooth upper surface, a lift plate positioned above said base plate, an internally threaded aperture through said lift plate, an elongated shaft having a first free end and an opposite second end, a portion of said elongated shaft having external threads formed thereon from an intermediate point thereon and extending to the said first free end, said first free end being received in said internally threaded aperture of said lift plate becoming threadedly engaged therewith, said first free end being movable through said aperture to contact and bear against said flat smooth upper surface of said base plate and a hand grasp member affixed to said second end of said elongated shaft, a hinge assembly to hingedly connect one end of said lift plate to a corresponding end of said base plate, the opposite end of said lift plate having a planar surface area to receive thereon the bottom edge of a door, said base plate being longer than said lift plate.

* * * * *